(12) United States Patent
Hardy et al.

(10) Patent No.: US 6,912,269 B2
(45) Date of Patent: Jun. 28, 2005

(54) TEST UNIT FOR USE AT A NETWORK INTERFACE DEVICE

(75) Inventors: William Christopher Hardy, Dallas, TX (US); Vaikunth N. Gupta, Potomac, MD (US)

(73) Assignee: MCI, Inc., Ashburn, VA (US)

( * ) Notice: Subject to any disclaimer, the term of this patent is extended or adjusted under 35 U.S.C. 154(b) by 96 days.

(21) Appl. No.: 10/290,427

(22) Filed: Nov. 7, 2002

(65) Prior Publication Data

US 2003/0063713 A1 Apr. 3, 2003

Related U.S. Application Data

(63) Continuation of application No. 09/315,245, filed on May 20, 1999, now Pat. No. 6,519,323.

(51) Int. Cl.[7] .......................... H04M 1/24; H04M 3/08; H04M 3/22

(52) U.S. Cl. ................ 379/29.01; 379/9.06; 379/26.01; 379/27.04; 379/29.02

(58) Field of Search ............................. 379/1.01, 9.06, 379/12, 22, 22.01, 26.01, 27.01, 27.04, 29.01, 29.02

(56) References Cited

U.S. PATENT DOCUMENTS 4,686,641 A * 8/1987 Evans ........................ 702/122

| 5,357,556 A | 10/1994 | Dresser |
| 5,553,059 A | 9/1996 | Emerson et al. |
| 5,581,257 A | 12/1996 | Greene et al. |
| 5,751,789 A | 5/1998 | Farris et al. |
| 5,825,849 A | 10/1998 | Garland et al. |
| 6,111,949 A | 8/2000 | Sheets et al. |

FOREIGN PATENT DOCUMENTS

| EP | 0 760 570 | 3/1997 |
| WO | 00/16533 | 3/2001 |

OTHER PUBLICATIONS

Marshall, J.F., Hornsby, G.H., & Price G.R., "ALE —Testing to the Customer Interface," British Telecommunications Engineering, Apr. 1987, p 50–55, vol. 6, London.

* cited by examiner

Primary Examiner—Binh Tieu

(57) ABSTRACT

A test unit provides testing capability at a network interface device (NID). The test unit may be remotely activated so that testing is initiated upon activation from a remote site. In one embodiment, a characteristic signal is sent over a telephone line toward the NID. A characteristic signal is detected and the testing unit is activated. The testing unit may perform multiple types of tests, including tests for detecting line loss, line noise and latency. The test may be implemented using electronic circuitry or using an intelligent computer system.

10 Claims, 9 Drawing Sheets

TEST UNIT FOR USE AT A NETWORK INTERFACE DEVICE

TECHNICAL FIELD

The present invention relates generally to telecommunication systems and more particularly to a test unit for use at a network interface device, including long distance lines, local lines and subscriber equipment.

BACKGROUND OF THE INVENTION

The United States Public Switched Telephone Network (PSTN) includes a number of different components. Each of these components was originally under the ownership and control of a single telephone service provider. Currently, however, respective components in the PSTN may be owned and/or under the responsibility of different parties. For example, a long distance telephone company may be responsible for long distance lines, whereas a local telephone company may be responsible for local lines, and a subscriber may be responsible for equipment at the subscriber premises.

When a malfunction in the PSTN arises, it is necessary to identify whether the malfunction is due to a problem located at the subscriber premises, in the subscriber loop or in the network of a chosen service provider. Responsibility for correcting the problem lies with the party responsible for the component where the problem lies. Matters are complicated by multiple service providers competing for local telephone communication services. As a result, the subscriber loop may be owned and maintained by one company yet leased by another company that provides local services to subscribers. Hence, each local service provider needs a way to immediately test for proper functioning of the network as far as a network interface device (NID). The NID is positioned at the DEMARC, i.e., the demarcation point where a local telephone company responsibility stops and the subscriber responsibility begins. Typically, the NID is located either adjacent to a subscriber's premises or a short distance away from the subscriber's premises. Thus, there is a need to be able to determine the location of a problem within the PSTN without incurring significant overhead and without suffering substantial delay.

SUMMARY OF THE INVENTION

The present invention addresses limitations of the conventional system by providing a remotely activated test unit at a NID. The test unit can perform a number of different tests to identify malfunctions and to determine the location of problems. For example, the test unit may be able to generate tones, silence a line and identify latency for transmitted signals. The test unit may be remotely activated to eliminate the need for sending maintenance personnel out to the NID.

In accordance with one aspect of the present invention, a component for testing a portion of a network is provided in a NID. The component includes a testing module for performing testing on a portion of the network as well as an activation module for activating the testing module to perform the testing. The activation module includes a remote activator for remote activation. The remote activator may take the form of a tone detector for detecting a characteristic tone or a radio frequency detector for detecting at least one characteristic radio signal for activating the testing module. The testing module includes a tone generator for generating a test tone. In addition, the testing module includes a silencing element for silencing a portion of the network or a loop-back element for echoing signals over a portion of the network.

In accordance with a further aspect of the present invention, a system is provided in a communications network that provides communications with customer premises. A network includes a local exchange carrier wiring. The system includes a NID for providing an interface between local exchange carrier wiring and customer premises. The system also includes a testing device for testing a portion of the network terminating at the NID.

In accordance with an additional aspect of the present invention, a test unit is positioned at a NID within a communications network. The NID is in proximity to subscriber premises. The test unit is operative to test at least a portion of the communications network. The test unit includes at least one element for initiating such a test.

In accordance with a further aspect of the present invention, a communications network includes a NID. Tests are performed with a test unit at the NID to determine whether the communications network is running properly and whether any problems exist in the communications network.

BRIEF DESCRIPTION OF THE DRAWINGS

An illustrative embodiment of the present invention will be described below relative to the following drawings.

DETAILED DESCRIPTION OF THE INVENTION

The illustrative embodiment of the present invention includes a test unit at a network interface device (NID). The positioning of the test unit at the NID enables testing to determine whether the problem resides at a given subscriber premises or in other portions of the communications network. The test unit can perform a number of different tests to determine whether portions of a communications network are operating properly. The test unit is remotely activated. It can be activated, for example, by sending a characteristic radio frequency (RF) signal pattern or a characteristic tone sequence.

Figure 1:
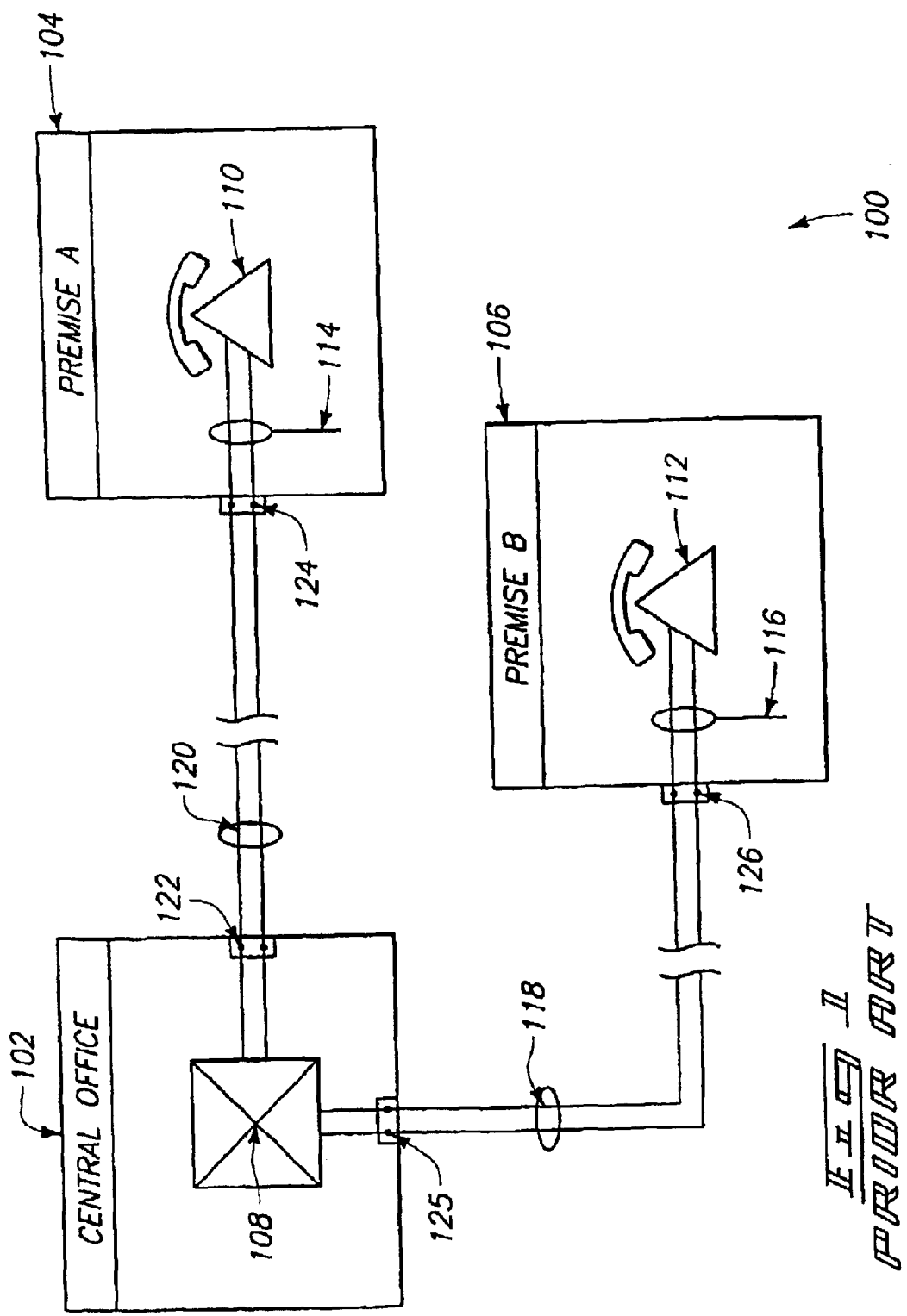
FIG. 1 is a diagram depicting connections between a central switching office and a subscriber's premises.

FIG. 1 depicts a portion 100 of a communications network between a central switching office 102 and subscriber premises 104 and 106. The subscriber premises 104 and 106 may be a home, an office or other facility in which a telephone set is present. Each of the subscriber premises 104 and 106 includes respective telephone sets 110 and 112. Copper wires 114 and 116 connect the telephone sets 110 and 112 to respective NIDs 124 and 126.

External telephone lines 120 extend from port card 122 at the central switching office 102 to the NID 124. Similarly, external telephone lines 118 extend from port card 125 to NID 126. Port cards 122 and 125 connect telephone lines with a central office switch 108. The switch 108 is responsible for switching calls to appropriate destinations. The switch 108 may effect an electrical connection between port card 122 and port card 125 to establish an end to end telephone connection between telephone 110 and telephone 112.

The "subscriber loop" between central switching office 102 and customer premises 104 is formed by the set of wires and connections that run between the port card 122 and the telephone set 110. The "subscriber loop" between the central switching office 102 and the customer premises 106 is formed by the set of wires and connections extending from port card 125 to telephone set 112.

Those skilled in the art will appreciate that the depiction of the communication network 100 shown in FIG. 1 is a somewhat simplified view of a typical communications network. Additional components may be contained within the communications network 100. Moreover, the organization of the communications network may differ from that depicted in FIG. 1. The depiction in FIG. 1 is intended to be merely illustrative and not limiting of the present invention.

Figure 2:
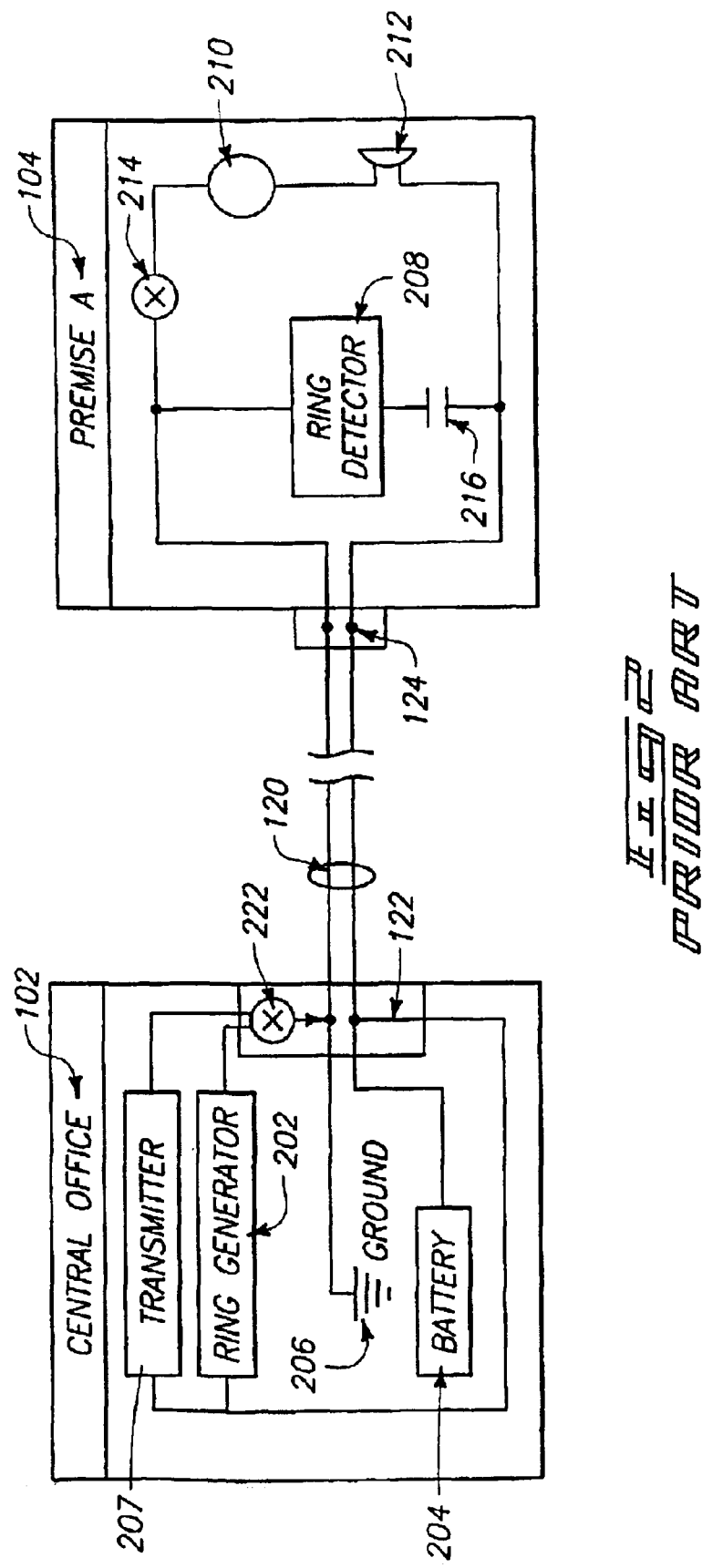
FIG. 2 is a diagram depicting major components utilized in the operation of a subscriber loop between a central switching office and a subscriber's premises of FIG. 1.

FIG. 2 depicts components in the central switching office 102 and subscriber premises (in this case, subscriber premises 104), that are used during normal operation of a telephone subscriber loop. The subscriber loop extends from port card 122 at the central switching office 102 through external telephone lines 120 and through NID 124. The central switching office 102 includes a ground 206 and a DC power source, such as battery 204. The battery 204 may provide a specified potential, such as 48 volts. The battery 204 drives current around the subscriber loop whenever the circuit (described in more detail below) is closed by effecting connection between the external telephone lines 120 that run through the NID 124. A switch 214 is provided at the subscriber premises 104. The switch 214 is open whenever a telephone (including earpiece 210 and mouthpiece 212) is "on hook" (e.g. when the telephone handset is resting on the cradle). The switch 214 is closed when the telephone is "off hook" (i.e. when the handset is not resting in the cradle). The closure of the switch 214 effects the closed circuit between the battery 204 and the ground 206 at the central switching office 102. As a result, a potential voltage is created that is sufficient to drive currents carrying voice (e.g. conversations) and data signals over the telephone lines 120. When switch 214 is open (i.e. the telephone is on hook), DC potential voltage on the subscriber loop is still there, but no current can flow.

When a call arrives at the central switching office 102 to be connected to a telephone that includes earpiece 210 and mouthpiece 212 at the subscriber premises 104, the central switching office takes steps to signal the need for the subscriber to answer the phone. The signaling is done by means of a ring generator 202 and a ring detector 208. A switch 222 connects the ring generator 202 with port card 122. When switch 222 is closed, an alternating current is generated by the ring generator 202 and placed onto the telephone line 120. The ring detector 208 recognizes the alternating current, and generates an audible ring signal at the subscriber premises 104. When the subscriber hears the telephone ring, the subscriber answers the telephone, resulting in the opening of the switch 222 and the removal of the alternating current from the subscriber loop. When the telephone call is completed, switch 214 is opened to remove the voltage potential across the telephone lines 120. Capacitor 216 isolates the ring detector 208 from the DC subscriber loop, so that the ring detector can be activated only by alternating current.

Figure 3:
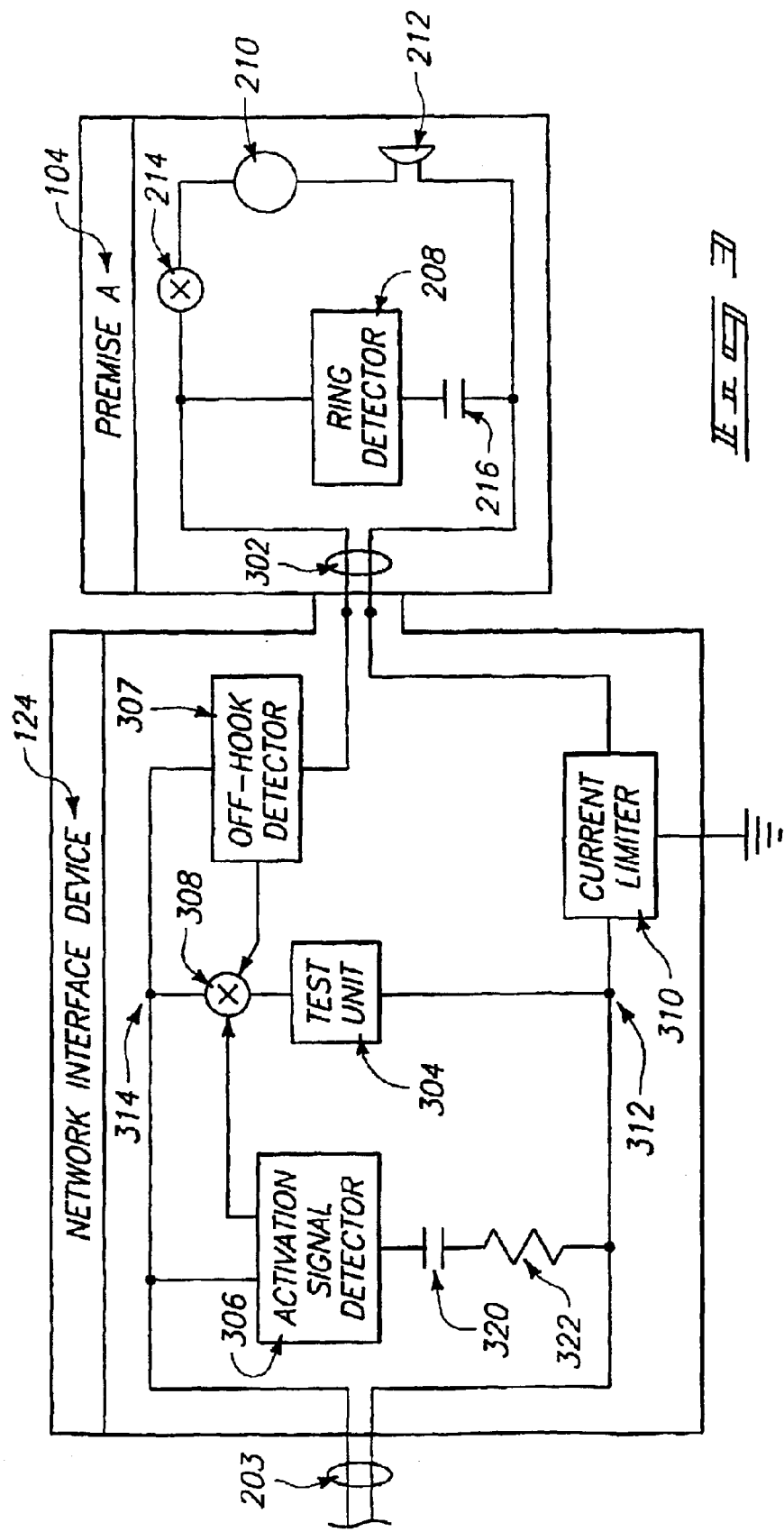
FIG. 3 is a diagram depicting in more detail components employed in a network interface device and subscriber premises.

Against the above-described background, the operation of the test unit may be better understood. As shown in FIG. 3, the test unit 304 is positioned in the NID 124 for customer premises 104. For the portion 100 of the communications network depicted in FIG. 1, the NID 126 and customer premises 106 may have similar configurations to NID 124 and customer premises 104, respectively, depicted in FIG. 3. In fact, each NID within a communications network may optionally include such a test unit.

As shown in FIG. 3, the NID 124 includes an activation signal detector 306. This activation signal detector 306 detects a distinct signal for activating the test unit 304. The distinct signal may be remotely generated and sent over the telephone lines 203 to the detector 306. The distinct signal may be transmitted from a transmitter 207, shown in FIG. 2, at the central switching office 102, which attaches to port card 122 as the ring generator 202 via switch 222. In one embodiment, the signal from the central switching office 102 is a low-level radio frequency signal. The preferred signal is the 20–25 kHz range in a band that is not allocated for commercial broadcasting. Nevertheless, those skilled in the art will appreciate that other bands may be used and that different distinct signals may be used to practice the present invention. The activation signal detector 306 may be implemented as the detector of the designated radio frequency via a phase locked loop tone detector. Capacitor 320 isolates the activation signal detector 306 from the rest of the subscriber loop. Resistor 322 assures that current does not flow into the activation signal detector 306 when the A/C ring signals are transmitted to the subscriber premises 104.

The NID 124 includes an off hook detector 307. The off hook detector 307 detects the increase in DC voltage that occurs when the telephone at the subscriber premises 104 goes off hook. The off hook detector 306 communicates the change to the off hook state to the switch 308. Those skilled in the art will appreciate that a number of different types of electronic modules may be utilized to implement the off hook detector. There are a number of off-the-shelf commercially available modules for implementing such functionality.

The NID 124 contains a standard current limiter 310. The current limiter 310 is tied to ground and provides protection against surges of electricity on the external telephone lines. The current limiter 310 may take the form of a fuse, an electronic surge protector or a ground shunt that automatically opens the subscriber loop circuit or runs the current ground when the voltage on the telephone line exceeds a threshold.

Switch 308 controls the behavior of the test unit 304. If the off hook detector 306 detects an off hook condition, the test unit 304 is deactivated by opening switch 308. Switch 308 is also controlled by input from the activation signal detector 306. The activation signal detector 306 will close the switch (presuming no off hook signal has been detected) when the activation signal is detected. Those skilled in the art will appreciate that a number of commercially available components may be utilized to implement switch 308.

Figure 4:
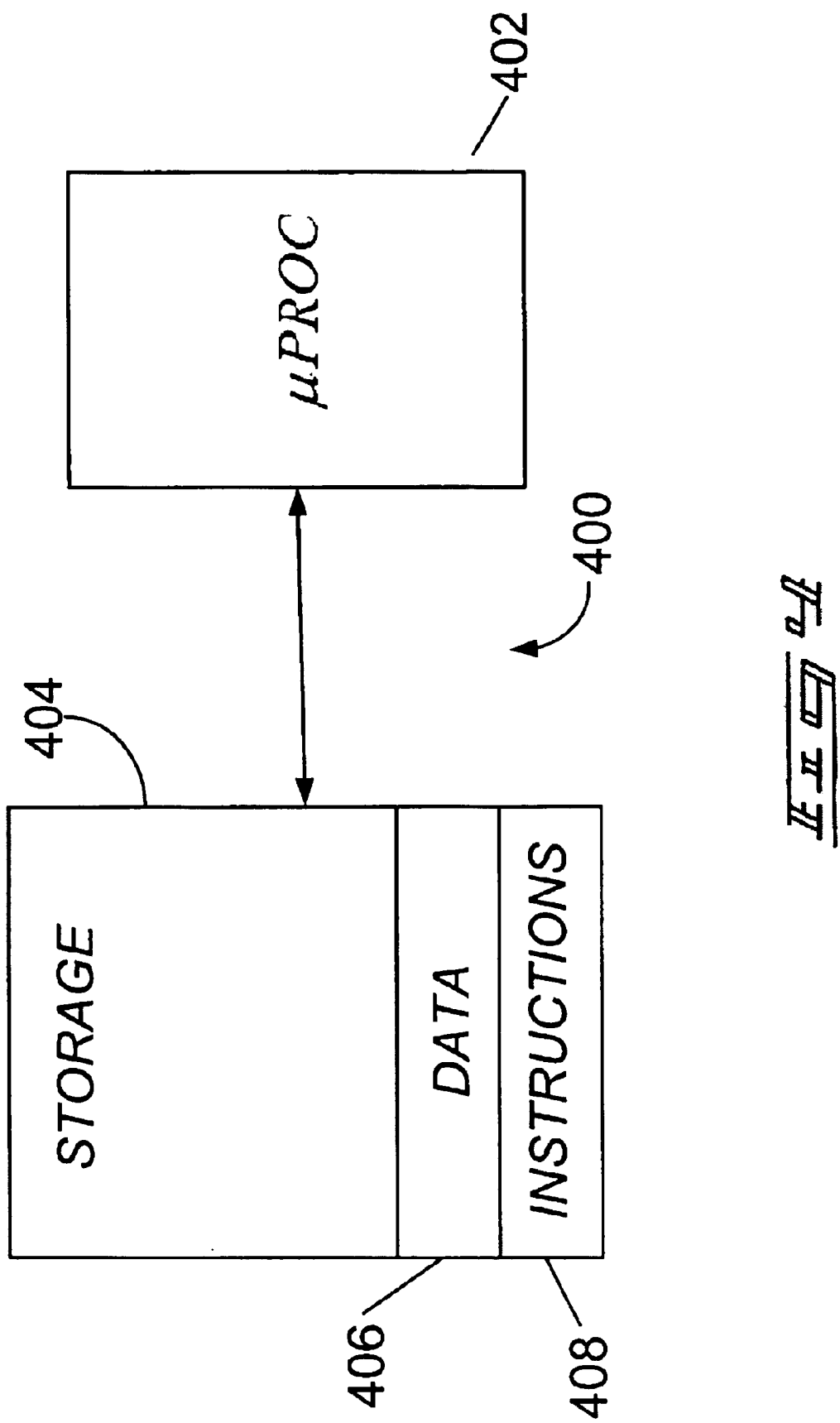
FIG. 4 depicts a test unit in an illustrative embodiment of the present invention.

The test unit 304 may be implemented using different alternatives. FIG. 4 depicts a preferred alternative where the test unit 304 is implemented as a special purpose microcomputer 400. The microcomputer 400 boots up anytime there is a non-negligible voltage between contact points 312 and 314 (see FIG. 3). The microcomputer 400 includes a microprocessor 402 and storage 404. The storage may include both primary and secondary memory and may include computer-readable media, such as optical disks, magnetic disks and the like. The storage 404 holds both data 406 and computer instructions 408. The data 406 and instructions 408 are used to implement the various tests performed by the test unit 304.

Those skilled in the art will appreciate that the test unit 304 may be also be implemented using dedicated electronic circuitry. The test unit 304 need not be implemented as a microcomputer. The test unit 304 may be implemented as servo-activated telephone response module, implementing functionality such as that described in co-pending application entitled "Interactive Telephone Response Module" which was filed on Feb. 5, 1998, application Ser. No. 09/019,323, which is explicitly incorporated by reference herein. U.S. patent application Ser. No. 09/019,323 issued on Aug. 22, 2000 as U.S. Pat. No. 6,108,404 and is entitled. "Method and System for Testing a Connection in a Telephone Network Using Interactive Telephone Response Module."Moreover, computing systems other than microcomputers may be utilized for implementing the test unit 304.

Figure 5:
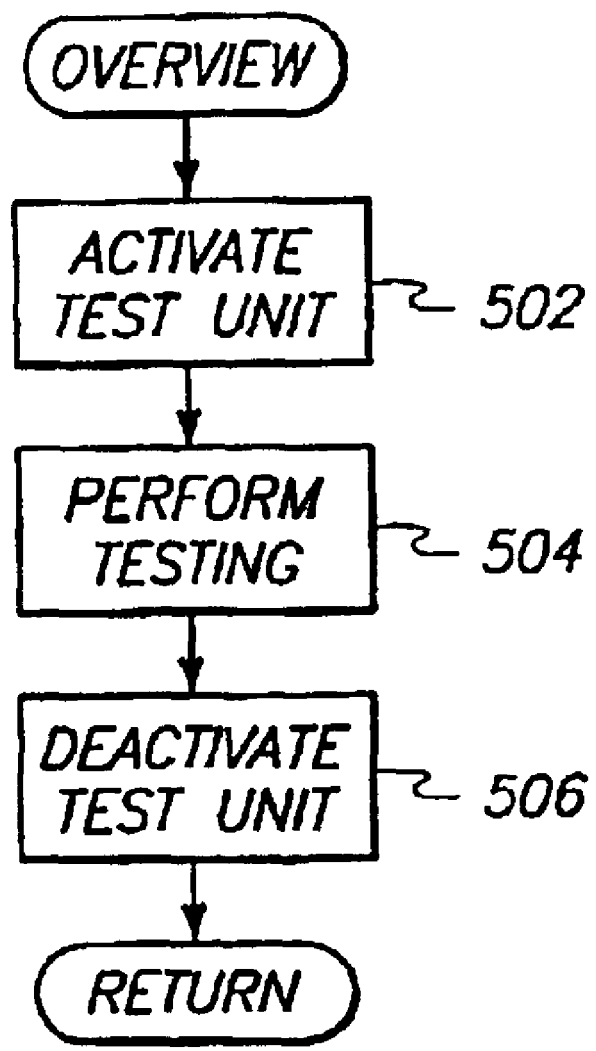
FIG. 5 is a flow chart that provides an overview of the steps performed to complete testing in the illustrative embodiment.

FIG. 5 provides a flow chart of the steps that are performed during testing. Initially, the test unit 304 is activated by sending an activation signal from the central switching office 102 toward the subscriber premises 104 (step 502 in FIG. 5). As was mentioned above, the activation signal is detected by activation signal detector 306. The activation signal detector 306 generates an output that closes switch 308 so that the test unit 304 becomes active. The test unit 304 is already running because of the presence of a voltage across end points 312 and 314. The test unit 304 then initiates one or more tests to identify the presence of problems within the telephone network and to identify the location of the problems within the telephone network (step 504 in FIG. 5). When the testing is completed, the test unit 304 may be deactivated by opening switch 308 (step 506 in FIG. 5).

Figure 6:
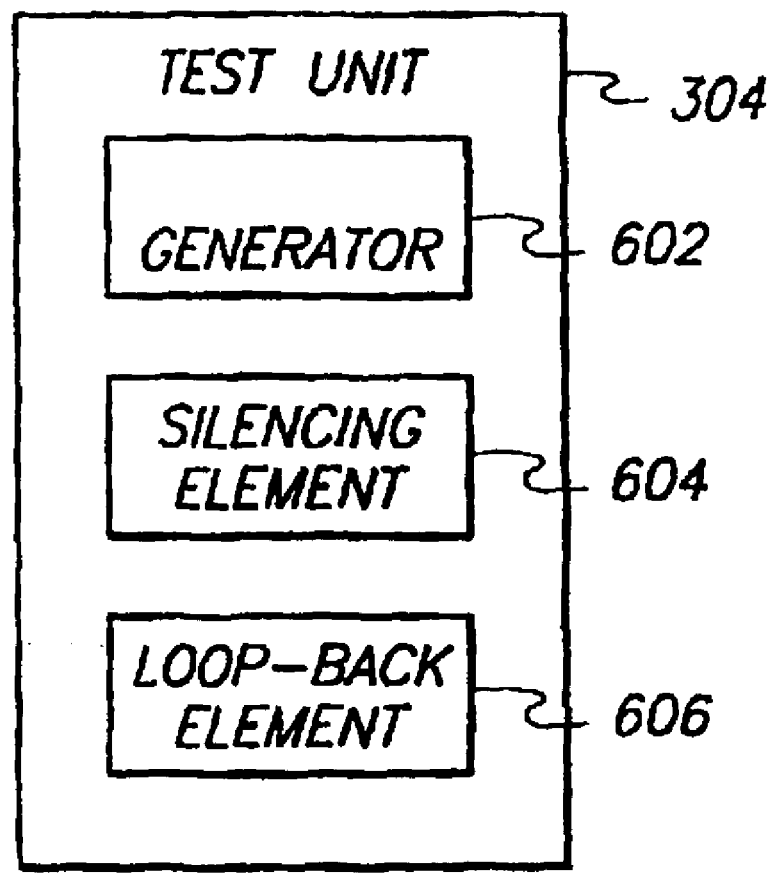
FIG. 6 is a diagram illustrative of a logical component of the test unit.
Figure 7:
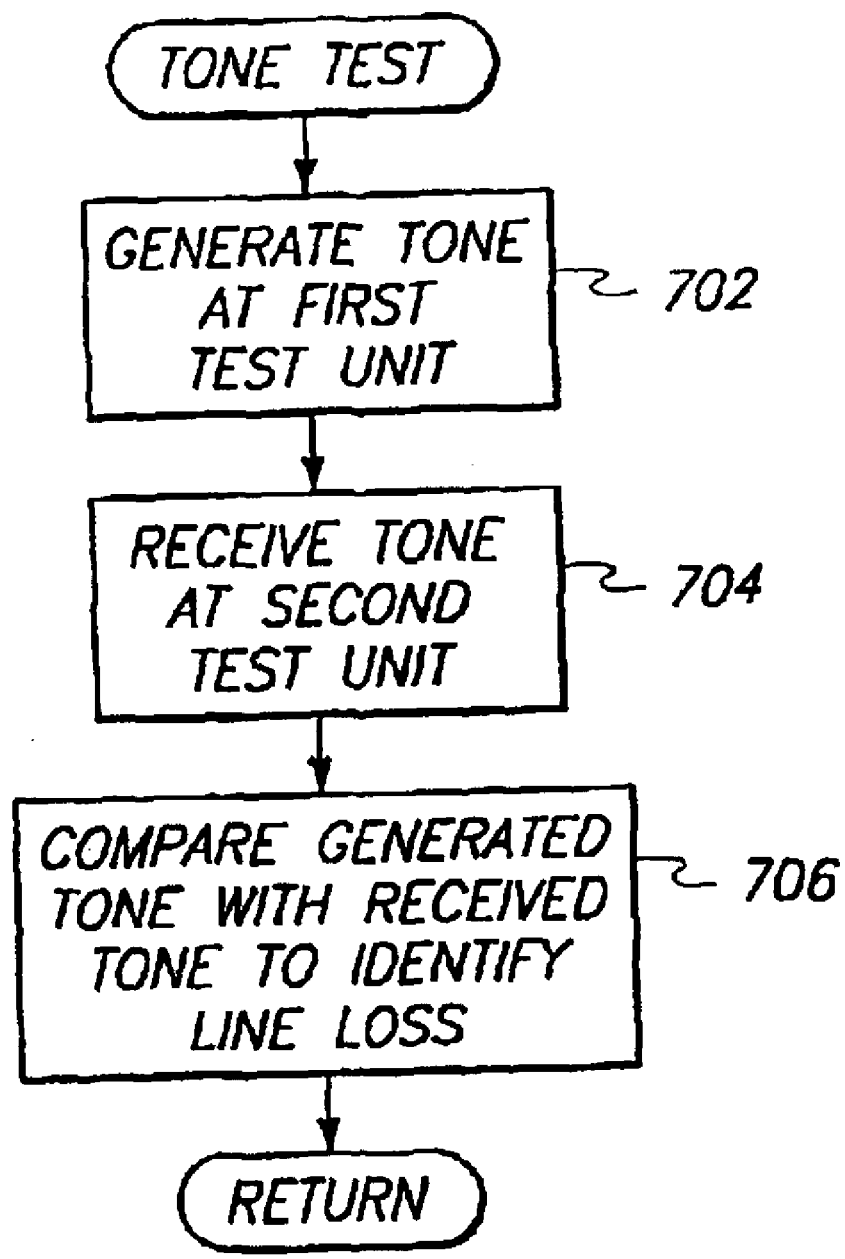
FIG. 7 is a flow chart illustrating the steps that are performed during a tone test.

FIG. 6 depicts the logical components of test unit 304. The test unit 304 includes a tone generator 602 for the generation of one or more tones for transmission over the communications network. FIG. 7 is a flow chart illustrating the steps that are performed during a tone test in which one or more tones are generated by the tone generator 602. Referring to FIG. 7, initially, a tone is generated at a first test unit within the communications network (step 702 in FIG. 7). The tone may, for example, constitute a sinusoidal signal with a predetermined amplitude and frequency. The tone is then transmitted to a second test unit position within another NID, where the tone is received (step 704 in FIG. 7). The second test unit compares the generated tone with the received tone to identify the extent of line loss over the line that connects the two test units (step 706 in FIG. 7).

Figure 8:
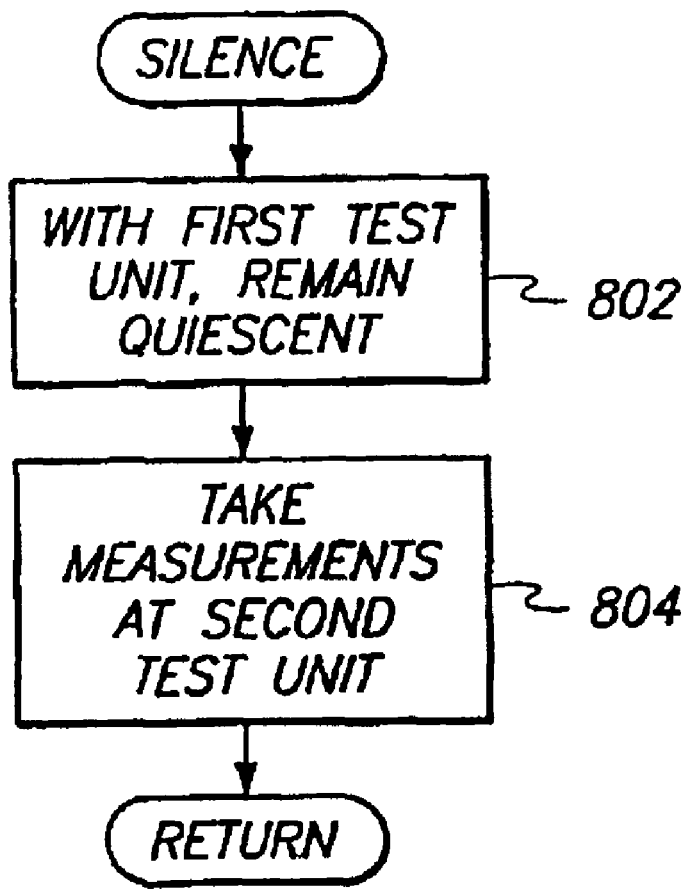
FIG. 8 is a flow chart illustrating the steps that are performed in silencing a phone line by a test unit.

The test unit 304 also includes a silencing element 604 as shown in FIG. 6. The silencing element 604 is used to silence a portion of the communications network. FIG. 8 depicts steps that are preformed in using the silencing element 604. A first test unit remains quiescent (step 802 in FIG. 8). While the first test unit is silent, a second test unit takes measurements (step 804 in FIG. 8). These measurements may include a measurement of line noise or echo path delay, for example.

Figure 9:
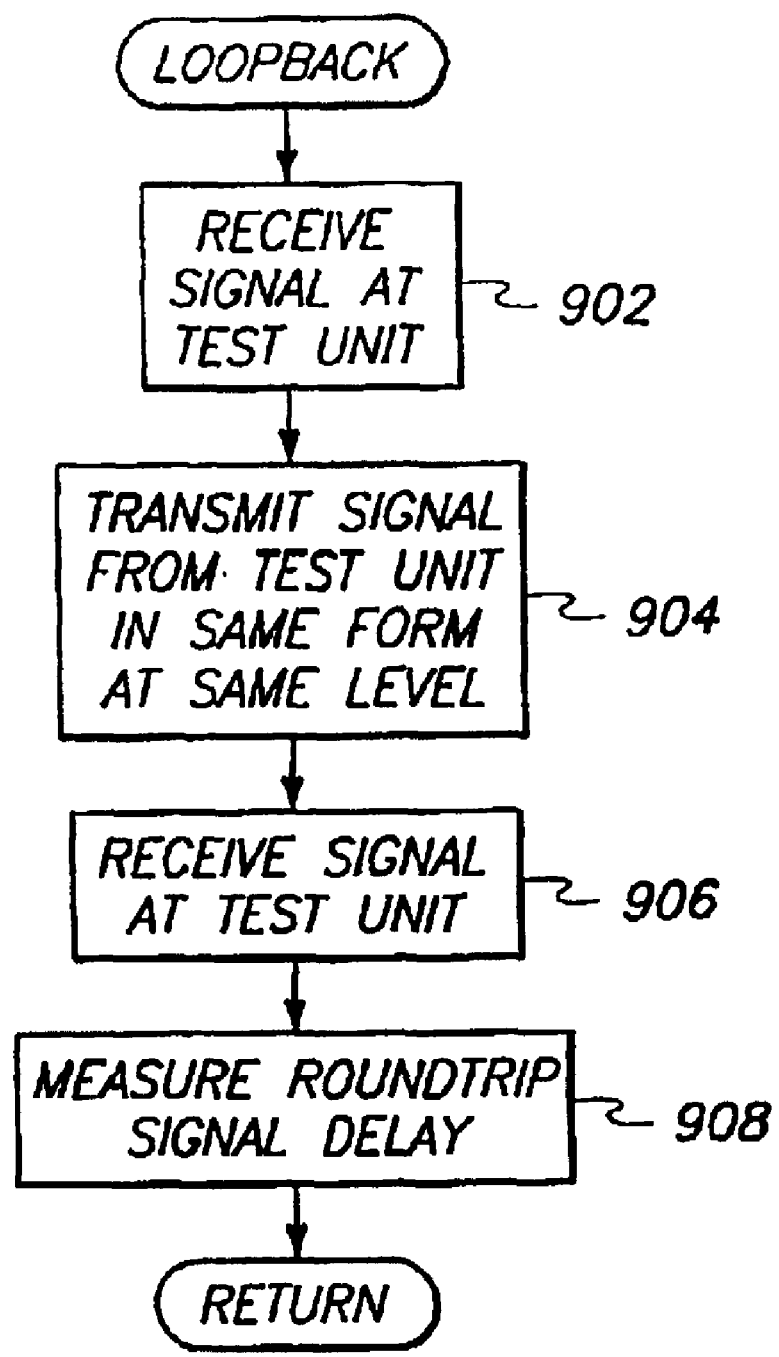
FIG. 9 is a flow chart illustrating the steps that are performed to loop-back a signal by a test unit.

The test unit 304 may also include a loop-back element 606. The loop-back element 606 seeks to return signals in the form in which they were received. FIG. 9 provides a flow chart of the steps that are performed using such a loop-back element 606 to perform a test by the test unit. A first test unit transmits a signal to a second test unit. The signal is received at the second test unit (step 902 in FIG. 9). The second test unit transmits the signal towards the first test unit such that the signal is in the same form and at the same level (step 904 in FIG. 9). In other words, the second test unit seeks to echo the signal back towards the first test unit that generated the test signal. The signal is received at the first test unit (step 906 in FIG. 9), and the first test unit records the time at receipt of the signal so that the roundtrip signal delay may be measured (step 908 in FIG. 9).

The test unit 304 may include a number of other different types of elements. The logical components 602, 604 and 606 depicted in FIG. 6 are intended to be merely illustrative and not limiting of the present invention. For example, the test unit 304 may include components for playing or for recording and analyzing digitally encoded voice data. It may also include capabilities to play or record and analyze digitally encoded signals representing semantically-encoded waveforms designed to test transmission and receipt of data over acoustic data links or digital subscriber links in the manner taught in U.S. Pat. No. 5,748,876, entitled, "System and Method For Testing Acoustic Modems With Semantically Encoded Waveforms, issued on May 5, 1998, which is incorporated by reference herein. Furthermore, the test unit 304 may include an acoustic data link with a remote test device for transmitting instructions and data to the remote test device. This acoustic data link may be used to send signals to play and record signals to receive processed data from the remote test device.

While the present invention has been described with reference to an illustrative embodiment thereof, those skilled in the art will appreciate that various changes in form and detail may be made without departing from the intended scope of the present invention as defined in the appended claims.

What is claimed is:

1. In a communication network for providing communications with customer premises, and said network including local exchange carrier wiring, a system comprising:
   a network interface device (NID) for providing an interface between the local exchange carrier wiring and the customer premises, said network interface device further includes:
   a switch;
   an off-hook detector to detect use of the communication network at the customer premises; and
   testing device for testing a portion of the network and terminating at the NID, the testing device including a silencing element for silencing the portion of the network, wherein said off-hook detector opens said switch to deactivate said testing device.

2. The system of claim 1, wherein the testing device includes a remote activation module for remote activation of the testing device to perform tests.

3. The system of claim 2, wherein the remote activation module includes a tone detector for detecting at least one characteristic tone for remote activation of the testing device to perform tests.

4. The system of claim 2, wherein the remote activation module includes a radio frequency detector for detecting at least one characteristic radio signal for remote activation of the testing device.

5. The system of claim 1, wherein the testing device includes a tone generator for generating a test tone.

6. The system of claim 1, wherein the network is a telephone network.

7. The system of claim 1, wherein the portion of the network is quiescent.

8. The system of claim 1, wherein the testing device includes a loop back element for returning signals in a form in which the signals are received.

9. The system of claim 1, wherein the testing device includes components for playing digitally encoded voice data.

10. The system of claim 1, wherein the testing device includes components for recording and analyzing digitally encoded voice data.

* * * * *